US010325039B2

(12) United States Patent
Wilcox et al.

(10) Patent No.: US 10,325,039 B2
(45) Date of Patent: Jun. 18, 2019

(54) METHOD FOR VIRTUALLY INSPECTING AN ACTUAL PRODUCED PART

(71) Applicant: HEXAGON TECHNOLOGY CENTER GMBH, Heerbrugg (CH)

(72) Inventors: William Wilcox, New York, NY (US); Derek Peeling, Burlington (CA)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 175 days.

(21) Appl. No.: 15/472,049

(22) Filed: Mar. 28, 2017

(65) Prior Publication Data
US 2018/0285499 A1    Oct. 4, 2018

(51) Int. Cl.
*G06F 17/50* (2006.01)
*G06T 19/00* (2011.01)
*G06T 19/20* (2011.01)
*G06T 17/20* (2006.01)

(52) U.S. Cl.
CPC ...... *G06F 17/5018* (2013.01); *G06F 17/5095* (2013.01); *G06T 19/00* (2013.01); *G06T 19/20* (2013.01); *G06F 2217/16* (2013.01); *G06T 17/20* (2013.01); *G06T 2219/012* (2013.01); *G06T 2219/2004* (2013.01); *G06T 2219/2021* (2013.01)

(58) Field of Classification Search
USPC .............................. 703/2; 345/419, 423, 428
See application file for complete search history.

(56) References Cited

U.S. PATENT DOCUMENTS

| 5,553,206 | A | * | 9/1996 | Meshkat | G06T 17/20 345/419 |
| 5,838,594 | A | * | 11/1998 | Kojima | G06T 17/20 703/2 |
| 5,838,595 | A | * | 11/1998 | Sullivan | G03F 7/70516 703/2 |
| 6,262,739 | B1 | * | 7/2001 | Migdal | G06T 17/20 345/423 |
| 6,392,647 | B1 | * | 5/2002 | Migdal | G06T 17/20 345/423 |

(Continued)

OTHER PUBLICATIONS

European Search Report dated Aug. 24, 2018 in application No. 18162138.4.

(Continued)

*Primary Examiner* — Thai Q Phan
(74) *Attorney, Agent, or Firm* — Maschoff Brennan

(57) ABSTRACT

A method and a computer programme product for virtually inspecting an actual produced part, comprising providing an ideal Finite Element (FE)-mesh corresponding to an ideal produced part, said ideal produced part comprising two or more mounting places, by measuring the actual produced part, generating a numerical representation of the actual produced part, generating an actual FE-mesh by modifying the ideal FE-mesh such that the shape of the ideal FE-mesh adapts to the numerical representation of the actual produced part, and performing an FE-analysis, by forcing the actual FE-mesh into position by constraining the mounting places of the actual FE-mesh, and determining a deformation of the actual FE mesh resulting from its constraint.

15 Claims, 3 Drawing Sheets

(56) References Cited

U.S. PATENT DOCUMENTS

| | | | | |
|---|---|---|---|---|
| 6,611,267 B2 * | 8/2003 | Migdal | ............... | G06T 17/20 |
| | | | | 345/428 |
| 7,024,342 B1 * | 4/2006 | Waite | ............... | B22D 17/32 |
| | | | | 700/118 |
| 7,129,942 B2 * | 10/2006 | Martin | ............... | G06T 17/20 |
| | | | | 345/423 |
| 9,171,396 B2 * | 10/2015 | Jenkins | ............... | G06T 15/40 |

OTHER PUBLICATIONS

Sabri et al., "Fixtureless profile inspection of non-rigid parts using the numerical inspection fixture with improved definition of displacement boundary conditions", Int J Adv' Manuf Technology, 82:1343-1352, Jul. 4, 2015.

Abenhaim et al., "A virtual fixture using a FE-based transformation model embedded into a constrained optimization for the dimensional inspection of nonrigid parts", Computer-Aided Design, May 2015.

Jaramillo et al., "On-line 3-D system for the inspection of deformable parts", The International Journal of Advanced Manufacturing Technology, vol. 57, Issue 9-12, pp. 1053-1063, May 4, 2011.

\* cited by examiner

METHOD FOR VIRTUALLY INSPECTING AN ACTUAL PRODUCED PART

FIELD OF THE INVENTION

The present invention relates to a method and a computer programme product for virtually inspecting an actual produced part.

BACKGROUND

A large portion of automotive assembly involves thin walled material such as sheet metal and plastic. These thin walled components are very flexible and their shape deforms easily when handled. During the inspection process, to check if the parts are in the correct shape and may be used for assembly, physical holding fixtures are created to constrain the parts. Physical holding fixtures are also created to check groups of adjacent parts with regard to how well the parts fit together and to troubleshoot assembly problems.

Sometimes the holding fixtures also model the adjacent thin walled components using precision machined surfaces in order to check critical components in isolation. These inspection holding fixtures are sometimes referred to as Meisterbock, checking fixtures, Total Assembly Checker (TAC) among other names. The fixtures are designed to hold an individual part or sub assembly (like a door) in a constrained and repeatable position simulating how the part will be oriented on the assembled vehicle.

While the current state of the art has been used successfully for many years, there are some limitations. These checking fixtures are expensive to produce. Usually there are long lead times associated with manufacturing these fixtures and this adds to the total time it takes to get a new vehicle into production. These fixtures also tend to be large and take up valuable floor space in the assembly factory. While they aim to be high in accuracy there are always some errors introduced by imperfectly constraining the part due to manufacturing errors in the production of the fixture.

There is another limitation of the current technology in that sheet metal parts are produced by suppliers all over the world. These parts must be shipped to the assembly factory to be checked. When there are defects found, the parts are returned to the supplier along with detailed information regarding the defects, so corrections may be made. Sometimes the parts are not returned but only the corrective data. The logistics of shipping parts back and forth during the pre-production stages often may add to delays in the entry into full production.

In addition, fixtures are static and may only hold the part as they were designed to do. Sometimes flexibility is needed to look at alternate ways of constraining the part in order to solve manufacturing problems. Further, fixtures are not easily or quickly adjustable, for example in order to simulate a systematic production error within a vehicle body (whom the fixture is representing).

SUMMARY

The invention relates to a method for virtually inspecting an actual produced part, comprising providing an ideal Finite Element (FE)-mesh corresponding to an ideal produced part, said ideal produced part comprising two or more mounting places, by measuring the actual produced part, generating a numerical representation of the actual produced part, generating an actual FE-mesh by modifying the ideal FE-mesh such that the shape of the ideal FE-mesh adapts to the numerical representation of the actual produced part, within an FE-analysis, forcing the actual FE-mesh into position by constraining the mounting places of the actual FE-mesh, determining a deformation of the actual FE mesh resulting from its constraint.

Constraining may be provided by a fixture model comprising two or more mounting restraints for constraining the mounting places.

The fixture model may be an actual fixture model, which is generated based on an actual produced fixture, or an ideal fixture model, which is generated based on design.

Within the FE analysis, further steps may be applying a gravity force to the constrained actual produced part, and determining the deformation of the actual FE mesh further resulting from the gravity force.

The method may further comprise generating an inspection result indicating whether the deformation of the constrained actual FE mesh remains within a given tolerance range.

The deformation may be characterised by a set of deviation values, wherein each deviation value may be assigned to a particular location on the constrained actual FE mesh, and wherein the deviation values may be determined based on an according local deviation at each particular location from a model of the ideal produced part ideally positioned relative to the fixture model, or from the ideal FE-mesh forced into position by constraining the mounting places of the ideal FE-mesh.

The method may further comprise placing an adjacent model in a predetermined position relative to the constrained actual FE-mesh such that the adjacent model is adjoining the actual FE mesh, determining a relative position and orientation between the adjacent model and the actual FE-mesh, and deriving at least one of clearance between the adjacent model and the actual FE-mesh, and flushness of the adjacent model relative to the actual FE-mesh.

The produced part may be a body panel or panel assembly, the fixture model may be a vehicle body, and the restraints may be one or more of: a hinge, a latch, a lock, a weld spot, a fold from hemming, bondings from glueing, bolts, screw, or any other fixing known in the art.

The invention further relates to a computer program product with program code being stored on a machine readable medium or embodied as an electromagnetic wave, the program code being configured to execute the steps: providing an ideal Finite Element (FE)-mesh corresponding to an ideal produced part, said ideal produced part comprising two or more mounting places, providing a numerical representation of an actual produced part, generating an actual FE-mesh by modifying the ideal FE-mesh such that the shape of the ideal FE-mesh adapts to the numerical representation of the actual produced part, within an FE-analysis, forcing the actual FE-mesh into position by constraining the mounting places of the actual FE-mesh, determining a deformation of the actual FE mesh resulting from its constraint.

Constraining may be provided by a fixture model comprising two or more mounting restraints for constraining the mounting places.

The fixture model may be an actual fixture model, which is generated based on an actual produced fixture, or an ideal fixture model, which is generated based on design.

Within the FE analysis, further steps may be applying a gravity force to the constrained actual produced part, and determining the deformation of the actual FE mesh further resulting from the gravity force.

The program code may further be configured to execute the step of generating an inspection result indicating whether the deformation of the constrained actual FE mesh remains within a given tolerance range.

The deformation may be characterised by a set of deviation values, wherein each deviation value may be assigned to a particular location on the constrained actual FE mesh, and wherein the deviation values may be determined based on an according local deviation at each particular location from a model of the ideal produced part ideally positioned relative to the fixture model, or the ideal FE-mesh forced into position by constraining the mounting places of the ideal FE-mesh.

The program code may further be configured to execute the steps of placing an adjacent model in a predetermined position relative to the constrained actual FE-mesh such that the adjacent model is adjoining the actual FE mesh, determining a relative position and orientation between the adjacent model and the actual FE-mesh, and deriving at least one of clearance between the adjacent model and the actual FE-mesh, and flushness of the adjacent model relative to the actual FE-mesh.

The invention provides the creation of a virtual checking fixture in software using Finite Element (FE) analysis technology to simulate the bending of a part that is mounted to the fixture. Individual thin walled panels or sub-assemblies may be inspected without a physical checking fixture at all.

An electronic representation of the actual part is created by using point cloud data captured from one of the many surveying sensors known in the art, e.g. white light scanners, blue light scanners, Coordinate Measuring Machines or 3D laser scanners. Rather than to try to convert this point cloud of the actual part into a mesh that is compatible with FEA, a mesh generated by FE-analysis from the theoretical CAD model of the ideal part is fitted to the point cloud. This results in a cleaner and more complete mesh.

The computer software will allow the user to define and save any number of mounting restraints, or in other words: constrain points. These mounting restraints may have a defined spatial relationship with respect to one another. Position and orientation of the mounting restraints may be defined in spatial coordinates and/or vectors. The construct of two or more mounting restraints may also be referred to as a "virtual" fixture. Many different virtual fixtures may be designed and used for the same part.

The FE-analysis software may then simulate the effects of clamping the FE-mesh of the actual produced part into the chosen virtual fixture. The FE-analysis software may also allow a user to minimize the number of constraints needed to bring this part or sub assembly into tolerance. The virtually clamped mesh may then be compared to the theoretical CAD model.

All manufacturing tolerances that govern the shape of the part as specified in the CAD design may be computed and an evaluation regarding compliance with the tolerances may be reported.

The invention may also allow for visualising any combination of actual produced parts and/or ideal produced parts to check for assembly quality. Actual parts may be fitted against mating or adjoining theoretical parts to look at a part in isolation. Actual parts may also be visualized together to investigate and provide corrective feedback for assembly issues.

The method or computer programme product according to the invention simulates the usage of the physical fixture how it is used in the art. Mathematical algorithms may be available to the user in order to adjust the assembly positions of the different components to optimise criteria such as flush or gap between panel parts, and style lines continuity.

According to the invention, a clean Finite Element-mesh of an actual part is created by measuring the part with one of many measurement methods to generate a three-dimensional numerical representation of the as-built part;

providing or creating a clean FE-analysis-optimised mesh of the ideal part (e.g. derived from the CAD model of the ideal or "target" produced part);

fitting this clean ideal FE-mesh onto the point cloud; this includes taking into account the errors both perpendicular to the part surfaces and also parallel to it; by this modification of the ideal FE-mesh, an "actual" FE-mesh is generated as it corresponds to the actual produced part;

Several three-dimensional numerical representations or several actual FE-meshes may hereby be averaged in order to achieve more statistical robustness.

The physical effects, a physical fixture would have on a physical produced part when said part is mounted onto said fixture, are simulated. Apart from being strictly forced into position by clamps, magnets, hinges, and mating with other parts, the part is also exposed to effects like gravity, or pressure from a seal or a buffer.

The method or the computer programme product according to the invention may also be integrated into the design/construction process: The minimum number of constraints to "fix" the part may be determined. Since parts are inherently flexible, manufacturers need to constrain the parts as they are assembled into the actual vehicle by spot welds, glue, hemmed edges, stiffening plates, pins, and/or hinges etc. Minimizing the number of constrains then translates into a simpler assembly process and thus saving money.

Effort and costs are saved and long lead times are reduced through the elimination of the need for physically manufacturing precision fixtures. Flexibility is introduced in the process of constraining the part by adding or removing virtual clamps. The invention further allows for flexibility in part alignment and assembly by using the electronic representation (FE-mesh, 3D model) of the actual part and/or neighbouring parts and assembling parts virtually.

A reduction in time may be achieved in the early assembly phases by scanning the parts at the facility where they are produced and then electronically transmitting the electronic representation where the OEM may determine by the method or computer programme product according to the invention if the parts are acceptable, and in case if not, where the problems have been and what changes need to be made in the production parameters. Such feedback may then also be transmitted electronically to reduce the logistics of needing to ship the physical parts to the assembly factory in order to be checked for acceptability.

The part may be checked with a virtual fixture in the die tryout stage. In the art, the precision physical fixture is not yet available at that time, so during die tryout it cannot be check whether the die is producing "good" parts. It is much easier to remodel the dies earlier at the die build factory rather than later when entering production is already prepared.

BRIEF DESCRIPTION OF THE DRAWINGS

In the following, the invention will be described in detail by referring to exemplary embodiments that are accompanied by figures, in which:

FIGS. 1, 2 and 3 show the generation of an actual FE-mesh 10 corresponding to an actual produced part. Each part mentioned herein may be a single part, a sub-assembly, or an assembly. FIGS. 1, 2 and 3 exemplarily refer to a vehicle door which usually is a sub-assembly or an assembly of at least two parts (e.g. formed sheets made of metal or composite). The method steps, in particular the steps that FIGS. 1, 2 and 3 refer to, may however also be applied to any other produced part, whether that be a vehicle part (e.g. fender, roof, trunk), an airplane part (e.g. wing, tail fin, body panel) or a part of any other product, the assemblage of whose components needs to be checked (e.g. computer body, phone or tablet casing).

A three-dimensional point cloud 12 being a numerical representation of the actual produced part is recorded by three-dimensionally measuring the actual produced part. An ideal FE-mesh 11 corresponding to an ideal produced part then is fitted to—or in other words: matched with—the point cloud 12, such that the shape of the ideal FE-mesh adapts to the shape of the point cloud. The shape of the mesh is set in a way to conform with the numerical representation of the actual part as it was produced. As seen in FIG. 2, each of the nodes 13 of the mesh, thereby, may be shifted if necessary to come as close as possible to the actual shape of the produced part. This approximation process results in the actual FE-mesh, see FIG. 3.

Figure 1:
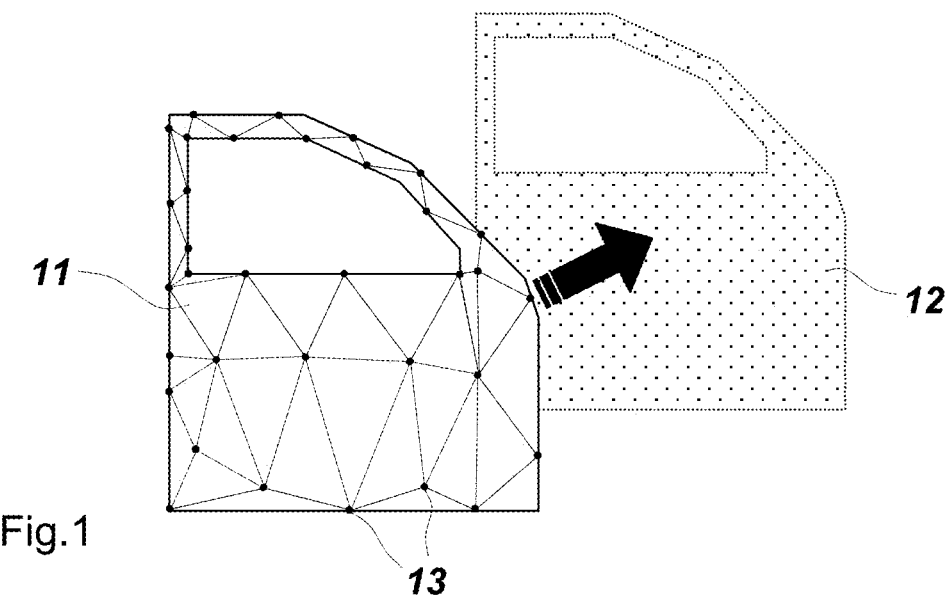
FIG. 1-3: show the generation of an actual FE-mesh corresponding to an actual produced part.
Figure 2:
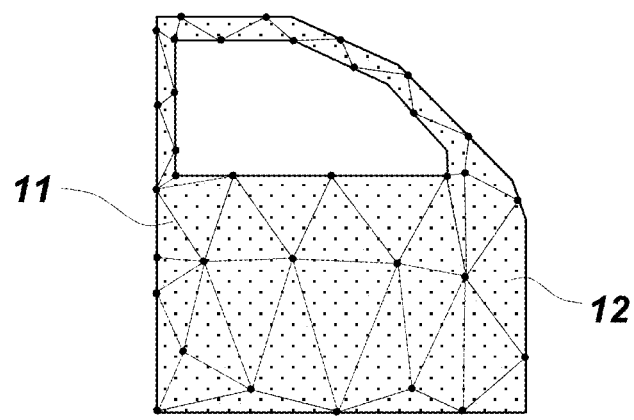
Figure 3:
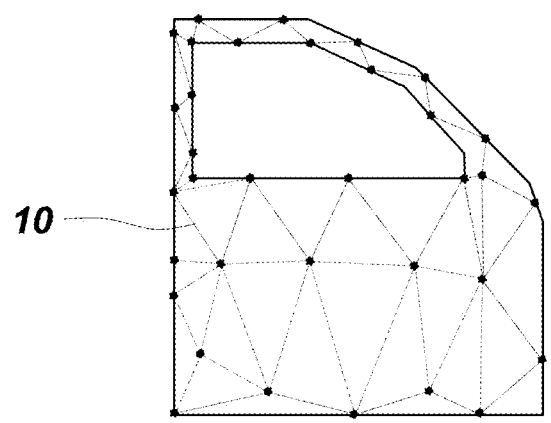
Figure 4:
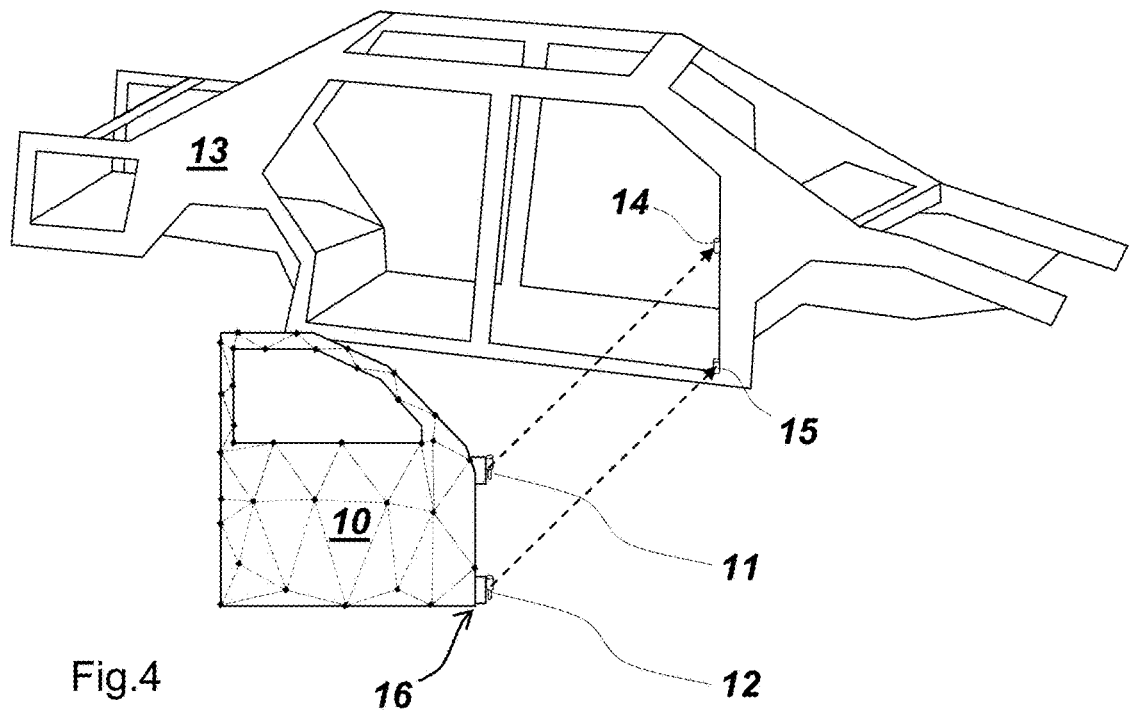
FIG. 4,5: show different embodiments of constraining the mounting places of the actual FE-mesh.
Figure 5:
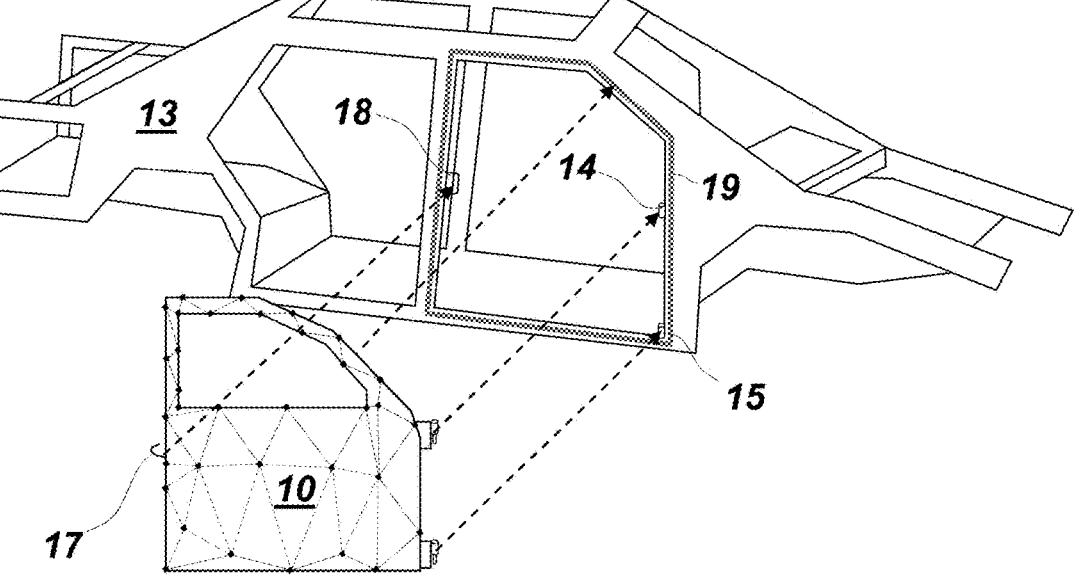
Figure 6:
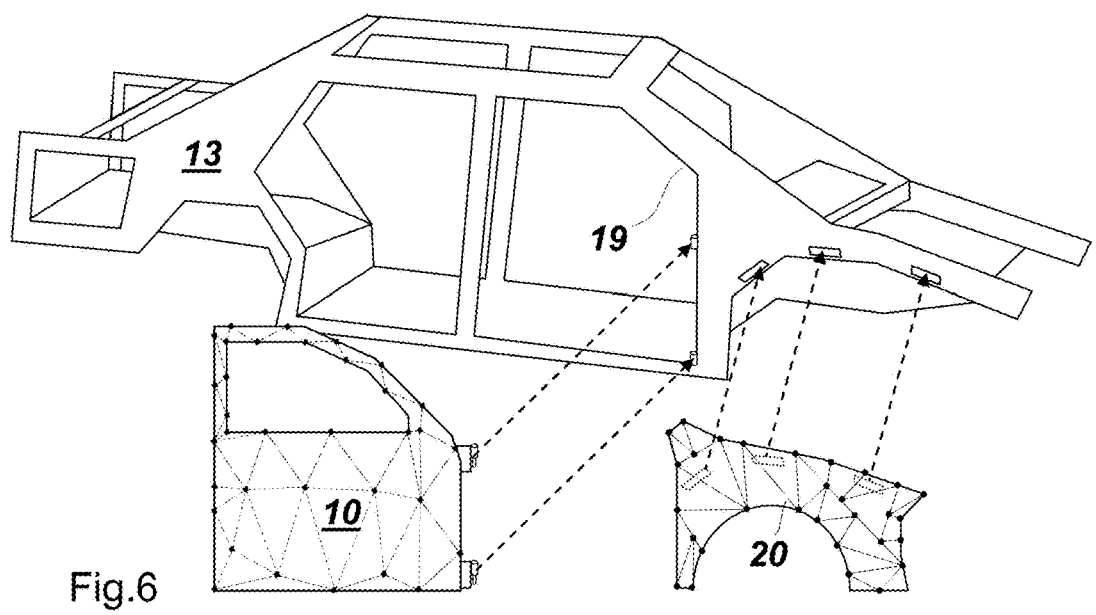
FIG. 6: shows an embodiment of the method wherein an adjacent model is brought into the analysis.

While FIGS. 4, 5 and 6 may as well refer to a real-world situation, where an actual produced door is mounted to the body fixture, here, said figures are supposed to show a part of a graphical user interface of Finite Element software run on a computer, as a user of the method or computer programme product according to the invention would utilise it.

FIG. 4 shows one exemplary utilisation according to the invention. An actual FE-mesh 10 generated as described above, comprises mounting places 11 and 12 which may be forced into position by being constrained. The constraints may be achieved by a fixture 13, said fixture comprising according mounting restraints 14, 15 at defined locations and orientations. Exemplarily, hinges are used as a medium of constraint between the body 13 and the door 10. As shown, the mounting restraints 14, 15 are barrels of said hinges, and the mounting places 11, 12 are the pins of the hinges. Although the pins of the hinges are shown on side of the door, the pins and barrels may be arranged the other way round. Also, the door mounting may be realised by means entirely other than hinges, which are known in the art.

With the actual FE-mesh having the at least two constraints shown in FIG. 4, an FE-analysis is determining deformations resulting from said constraints. The application of gravity force may be regarded or disregarded in the FE-analysis.

The mounting restraints on the fixture's side and the according mounting places on the door's side may each be more than just two, as FIG. 5 shows. Further constraints may for example be enforced by elements of a latch 18/17, and a further force may be induced by a door seal 19. The mounting place on the door corresponding to the latch 18 is a hook 17 and the place of force application on the door corresponding to the seal 19 is a surface on the inner circumference of the door (not numbered in the figure). The seal 19 may as well be arranged on the door's side.

In case all of the four different constraints shown in FIG. 5 being present, the door is exposed to various applications of force when it snapped shut. The latch elements 17, 18 and the hinges elements 11, 12/14, 15 provide the door being pressed against the sealing 19 such that forces apply in all of said mounting places on the door, which results in deformations of the door. These deformations are determined with the simulation of the Finite Element Analysis according to the invention.

In the FE-analysis, the stiffness of the fixture model 13 may be considered significantly higher than the stiffness of the actual FE-mesh. In particular, the deformability of the fixture model may be considered negligible.

FIG. 6 shows an adjacent model 20 (fender) adjoining the actual FE-mesh 10 (door). The adjacent model 20 in this case is also an FE-mesh, however, it may also be a mere 3D CAD model of the part. Said adjacent FE-mesh may be an ideal FE-mesh (i.e. corresponding to a designed part) or an actual FE-mesh (i.e. corresponding to a produced part). In the shown embodiment, the adjacent FE-mesh 20 also has mounting places by which it may be constrained by according mounting restraints on the fixture. As a result from the three constraints shown in the figure, the adjacent FE-mesh may also experience deformations. Generally, the simulated constraints may represent e.g. magnetising or physical clamping, welding, screwing, coupling, riveting, etc.

Figure 7:
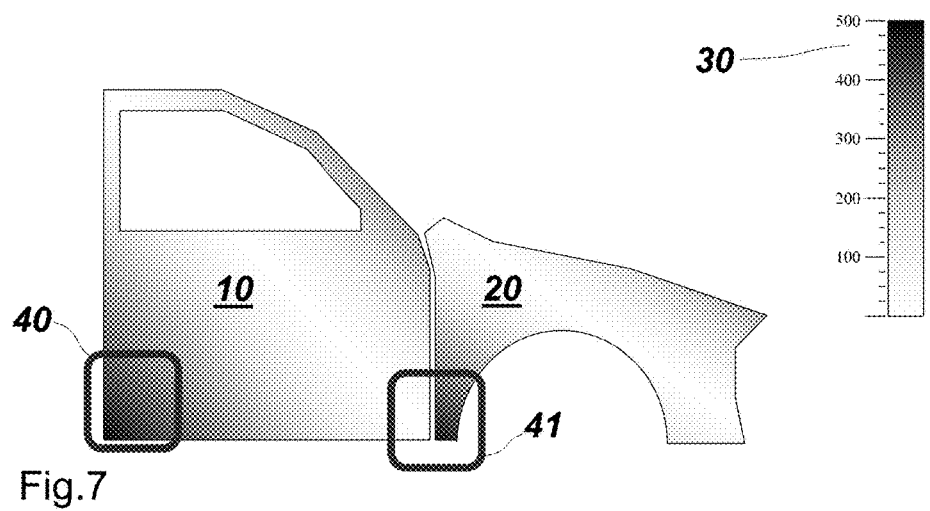
FIG. 7,8: show different evaluations based on the method or computer programme product according to the invention.

FIG. 7 shows the evaluation of the arrangement as set in FIG. 6: two adjacent parts may be analysed relative to each other regarding flushness. The scale 30 indicates a deviation from the ideal part form/position. The shades or colours of the scale 30 are applied to at least one of the models or meshes to identify the problematic regions. The shown evaluation may as well be made for only one part, e.g. according to the arrangement of FIG. 4 or 5.

With the evaluation according to FIG. 7, the flushness between part 10 and part 20 may be checked ergonomically. Where the neighbouring parts have high contrast regarding the shade/colour, the gap perpendicular to the part surface is larger.

In particular, a marking 40 may be provided, signalising that in the marked region a given tolerance range has been exceeded regarding deviation from an ideally positioned/formed part.

In particular, a marking 41 may be provided, signalising that in the marked region a given tolerance range regarding flushness has been exceeded.

Figure 8:
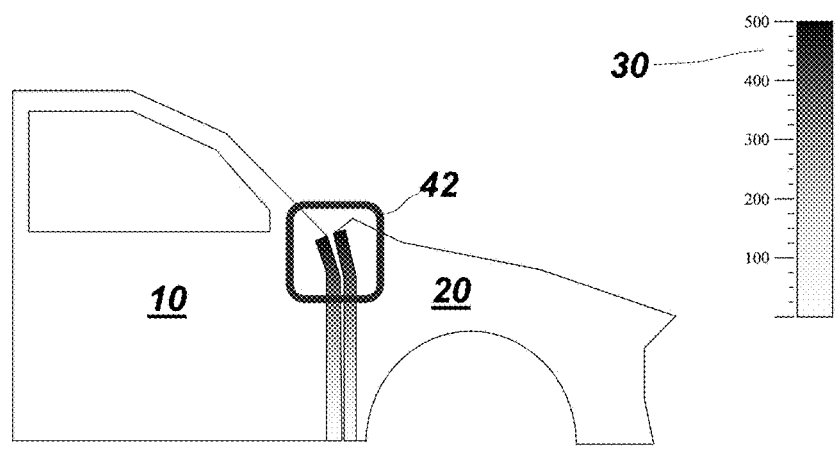

As an exemplary embodiment, FIG. 8 shows a further evaluation of the arrangement as set in FIG. 6: two adjacent parts may be analysed relative to each other regarding clearance. The scale 30 indicates a deviation from an ideal gap width. The shades or colours of the scale 30 are applied to at least one of the models or meshes to identify the problematic regions.

With the evaluation according to FIG. 8, the clearance between part 10 and part 20 may be checked ergonomically. A stripe may be shown along the gap between the two parts. Said stripe may be shown in the gap, towards one of the neighbouring parts, or two stripes towards both neighbouring parts (as shown in the figure). Where the stripes have high contrast regarding the shade/colour, the gap along the part surface is larger.

In particular, a marking 42 may be provided, signalising that in the marked region a given tolerance range has been exceeded regarding deviation from an ideal gap. Also further criteria may be considered, when evaluating two parts relative to each other, such as a check if reflections of light are coherent or smooth when looked at the gap between the parts. Many other criteria known in the art of quality management may be considered just like the aforementioned.

Following the principle as shown in the figures and as described above, it is a particular purpose of the present invention to examine the effect of a combined mounting of a plurality of parts together. According to known strategies in Quality Management, it is not desired to manufacture every part in the highest possible preciseness, but rather to achieve a total accuracy of the "symphony" of several assembled/mounted parts which is just acceptable. Therefore, the FE-meshes of every part participating in the simulation according to the invention, but also the fixture itself, may correspond to an actual produced part.

Although the invention is described above with exemplary reference to the construction of vehicles, where the assemblage of parts is checked in a virtual way, the invention as well relates to aerospace (spaceships, aircrafts), the electronics industries (laptops, Smartphones, stereo equipments) or any other industry facing challenges in constructing multi-component products, especially products having thin-walled body panels.

Although the invention is illustrated above, partly with reference to some embodiments, it must be understood that numerous modifications and combinations of different features of the embodiments may be made. All of these modifications lie within the scope of the appended claims.

The invention claimed is:

1. A method for virtually inspecting an actual produced part, the method comprising:
   providing an ideal Finite Element (FE)-mesh corresponding to an ideal produced part, said ideal produced part comprising two or more mounting places;
   generating a numerical representation of the actual produced part by measuring the actual produced part;
   generating an actual FE-mesh by modifying the ideal FE-mesh such that the shape of the ideal FE-mesh adapts to the numerical representation of the actual produced part; and
   performing an FE-analysis by:
      forcing the actual FE-mesh into position by constraining the mounting places of the actual FE-mesh, and
      determining a deformation of the actual FE-mesh resulting from its constraint.

2. The method according to claim 1, wherein constraining is provided by a fixture model comprising two or more mounting restraints for constraining the mounting places.

3. The method according to claim 2, wherein the fixture model is:
   an actual fixture model generated based on an actual produced fixture, or
   an ideal fixture model generated based on design.

4. The method according to claim 1, wherein the FE analysis further includes:
   applying a force resulting from at least one of gravity, a seal, and a buffer to the constrained actual produced part, and
   determining the deformation of the actual FE mesh further resulting from said force.

5. The method according to claim 1, further comprising:
   generating an inspection result indicating whether the deformation of the constrained actual FE-mesh remains within a given tolerance range.

6. The method according to claim 2,
   wherein the deformation is characterised by a set of deviation values, wherein each deviation value is assigned to a particular location on the constrained actual FE-mesh, and wherein the deviation values are determined based on a local deviation at each particular location from:
      a model of the ideal produced part ideally positioned relative to the fixture model, or
      the ideal FE-mesh forced into position by constraining the mounting places of the ideal FE-mesh.

7. The method according to claim 1, further comprising:
   placing an adjacent model in a predetermined position relative to the constrained actual FE-mesh such that the adjacent model is adjoining the actual FE-mesh;
   determining a relative position and orientation between the adjacent model and the actual FE-meshl and
   deriving at least one of:
      clearance between the adjacent model and the actual FE-mesh, and
      flushness of the adjacent model relative to the actual FE-mesh.

8. The method according to claim 2, wherein:
   the produced part is a body panel,
   the fixture model is a vehicle body, and
   the restraints are one or more of a weld spot, a bonding spot, a hemming spot, a hinge, a latch, a lock, a bolting, and a screw connection.

9. A computer program product with program code being stored on a machine readable medium, the program code being configured to execute the method comprising:
   providing an ideal Finite Element (FE)-mesh corresponding to an ideal produced part, said ideal produced part comprising two or more mounting places;
   providing a numerical representation of an actual produced part;
   generating an actual FE-mesh by modifying the ideal FE-mesh such that the shape of the ideal FE-mesh adapts to the numerical representation of the actual produced part; and
   performing an FE-analysis by:
      forcing the actual FE-mesh into position by constraining the mounting places of the actual FE-mesh, and
      determining a deformation of the actual FE-mesh resulting from its constraint.

10. The computer program product according to claim 9, wherein constraining is provided by a fixture model comprising two or more mounting restraints for constraining the mounting places.

11. The computer program product according to claim 9, wherein the fixture model is:
   an actual fixture model generated based on an actual produced fixture, or
   an ideal fixture model generated based on design.

12. The computer program product according to claim 9, the FE analysis further comprising:
   applying a force resulting from at least one of gravity, a seal, and a buffer to the constrained actual produced part, and
   determining the deformation of the actual FE mesh further resulting from said force.

13. The computer program product according claim 9, further comprising:
   generating an inspection result indicating whether the deformation of the constrained actual FE-mesh remains within a given tolerance range.

14. The computer program product according to claim 10, wherein the deformation is characterised by a set of deviation values, wherein each deviation value is assigned to a particular location on the constrained actual FE-mesh, and wherein the deviation values are determined based on a local deviation at each particular location from:
- a model of the ideal produced part ideally positioned relative to the fixture model, or
- the ideal FE-mesh forced into position by constraining the mounting places of the ideal FE-mesh.

15. The computer program product according to claim 9, further comprising:
- placing an adjacent model in a predetermined position relative to the constrained actual FE-mesh such that the adjacent model is adjoining the actual FE-mesh;
- determining a relative position and orientation between the adjacent model and the actual FE-mesh; and
- deriving at least one of:
  - clearance between the adjacent model and the actual FE-mesh, and
  - flushness of the adjacent model relative to the actual FE-mesh.

\* \* \* \* \*